United States Patent Office 3,288,750
Patented Nov. 29, 1966

3,288,750
POLYMERIZATION OF PHENYL
GLYCIDYL ETHER
Charles C. Price, Lansdowne, Pa., assignor, by mesne assignments, to The General Tire & Rubber Company, Akron, Ohio, a corporation of Ohio
No Drawing. Filed July 3, 1958, Ser. No. 746,315
11 Claims. (Cl. 260—47)

This invention relates to the production of polymerized products and, particularly, to the polymerization of phenyl glycidyl ether in which a three membered ring consisting of two carbon atoms and one oxygen atom is acted upon by a coordinating metal oxide catalyst such as aluminum triisopropoxide and preferably a co-catalyst to form a relatively linear long polymer chain.

The present application is a continuation-in-part of my copending application, Serial No. 651,181, filed April 8, 1957, now abandoned, in which is directed to the polymerization of alkylene oxides having three-membered rings such as propylene oxide with a coordinating metal alkoxide catalyst and preferably a metal halide co-catalyst. It has been proposed to react unsaturated hydrocarbons with an aluminum isopropoxide catalyst and a co-catalyst such as zinc chloride as shown in U.S. Patent No. 2,440,750 to Kraus. However, polymerization of an olefin oxide and particularly an alkyl-aryl substituted olefin oxide such as phenyl glycidyl ether to form commercially useful polymers including high molecular weight isotactic polymers has never been suggested.

It is an object of the present invention to provide a quick and efficient method of polymerizing phenyl glycidyl ether.

It is an object to provide a relatively high molecular weight isotactic polymer of phenyl glycidyl ether.

According to the present invention, I have found that useful polymers, and particularly high molecular weight isotactic polymers, of phenyl glycidyl ether can be prepared by maintaining monomeric phenyl glycidyl ether in contact with relatively small amounts of a catalyst, which is preferably a mixture of zinc isopropoxide and zinc chloride, for a suitable period of time to obtain a solid polymer.

While by far the best catalyst for production of high molecular weight isotactic polymers is an alkoxide of a coordinating metal such as aluminum isopropoxide and preferably also a metal halide which operates as a co-catalyst, aluminum trialkyls such as aluminum triethyl or other transition metal alkyls may be employed as a polymerization catalyst although the resulting polymer has only limited commercial usefulness as films or coatings, the polymer being a much less crystalline polymerization product. Also the product is somewhat discolored and is difficult to purify to remove residual catalyst.

The coordinating metal alkoxide of the catalyst system may be selected from one or more alkoxides or the aryloxides of a metal having an ionic radius of .2 to .98 A. an atomic radius of less than 1.6 A. an atomic weight less than 66 and preferably, existing in a state wherein its valence is 2, 3 or 4. Alkoxides of these metals in groups 2, 3, 4, and 8 are particularly alkoxides of aluminum, chromium, iron, magnesium, titanium, cobalt and nickel are found to produce high molecular weight polymers.

Alkoxides of aluminum are much preferred however and have advantages over all others especially in combination with a co-catalyst. Examples of the metal alkoxides are aluminum methoxide, aluminum ethoxide, aluminum isopropoxide, aluminum butoxide, and corresponding alkoxides of the other of the above coordinating metals. Alkoxides in which the alkoxy groups have but one carbon atom are apparently less compatible with olefin oxides having 3 or more carbons than are alkoxides in which the alkoxy groups have two or more carbons and are therefore less effective catalysts. Alkoxides in which the alkoxy groups or at least one alkoxy group contains 3 or 4 carbon atoms are preferred and especially when they contain a tertiary carbon atom such as is present in the isopropoxides.

In addition to the metal alkoxides in which the alkoxy group consists only of carbon, hydrogen and oxygen, I may also use chloro or halogen substituted metal alkoxides such as aluminum chloroisopropoxide, aluminum chloroethoxide and the corresponding bromine compounds and corresponding chloro alkoxides of the other coordinating metals.

It is not essential that all of the organic groups attached to the metal be linked through oxygen atoms as we have also found that alkyl alkoxides, in which one or more alkyl groups are directly attached to metal and one or more alkoxide groups are also attached to the metal, are also operable as a catalyst alone or in conjunction with the mono or divalent metal co-catalysts hereafter mentioned. Examples of such materials are diethyl aluminum butoxide, ethyl zinc butoxide, propyl aluminum ditertiary butoxide, as well as diethyl aluminum propoxide. These materials can also be present in admixture with the alkoxide, such as aluminum tri-isopropoxide and zinc and magnesium ditertiary butoxides mentioned above.

While the polymerization of the olefin oxides occurs in the presence of the alkoxides of the above metals to produce a high molecular weight polymer, I have found that the polymerization occurs much more rapidly and to a much higher yield in the presence of a small amount of a co-catalyst of compound of a metal found in one of groups 1, 2 and 8 having a valence not in excess of 2 in that compound and having a molecular weight, ionic radius, and atomic radius, within the limits mentioned for the above metals. Of the co-catalyst metals, zinc, and beryllium are preferred and the compound is preferably a chloride of one or more of these metals.

In the catalyst, the proportions of the compound with the metal having three or four valences, such for example as aluminum alkoxide, to the compound of the metal having one or two valences preferably 2, such as zinc, lithium, cobalt and beryllium chlorides, may vary widely as only a small amount of the one or two valent-metal compound exerts a strong activating influence on the alkoxide. Generally, the alkoxides of the three or four valent-metals constitute a major or dominant proportion of the catalyst. As little as 1% of the two-valent-metal compound especially metal chloride or to some extent even oxide acts to greatly increase the activity of the three-valent-metal alkoxides. Generally, however, at least five molar percent of these metal compounds are used to provide an increased rate of better polymerization. About optimum polymerization speeds are obtained with 10 or 20 molar percent to about 75 or 80 molar precent of the two-valent-metal compound, such as zinc chloride and good speed of polymerization is obtained with as much as 95 molar percent of one or more of the chlorides, etc. of these metals having a valence of 2 which operate as a co-catalyst. In general, therefore, the co-catalyst system for best results should have the three-valent-metal compound and the two-valent-metal compound each within the range of 5 to 95 molar percent of the mixture.

It will be seen that the preferred catalysts are of the following general types:

Type I*a* has the general formula Me(OR)$_x$, where "R" is hydrocarbon alkyl or aryl and "Me" is a metal of valence $x$ which can be 2, 3, or 4. This is effective but relatively slow.

Type II*a* has the general formula Me(OR')$_x$, where R' is alkyl or aryl which may have other substituents such as halogen which do not form strong bonds with the complexing metal as do ketone and aldehyde groups (which are not suitable) or terminate the polymerization as do groups with active protons. This is somewhat faster than type I*a*, and type I*b* and type II*b* like types I*a* and II*a* but differing in that at least one of the OR radicals is substituted by halogen or oxygen, to provide a general formula Me(X)$_n$(OR)$_m$ where $m+n$ together equal the valence of the metal, Me. In this latter type those anions which form intermediate type bonds between a pure ionic (e.g. F$^\ominus$) and highly co-valent (e.g. I$^\ominus$) are suitable for X, with greatest efficiency, starting from the most efficient one to the least efficient one, being in the order of Cl$^\ominus$>O$^\ominus$>Br$^\ominus$.

The preferred catalyst system is, however, type I*c* and type II*c*, where a metal alkoxide or halogen-substituted metal alkoxide or one of the above substituted metal alkoxides is used in combination with a compound of the formula Me'X$_y$, where X is halogen or oxygen and is preferably Cl$^\ominus$. These two metal compounds are believed to form binary complexes, and it is therefore a necessary requisite for ease of complex formation that Me and Me' have ionic radii between 0.20 A. and 0.98 A., 0.5 to 0.8 A. being the most suitable, it being probable that these co-catalyst mixtures have a polymeric bridge structure of the formula

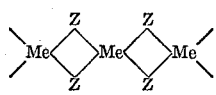

where Z is equal to Cl$^\ominus$, O$^\oplus$, Br$^\ominus$, and OR$^\ominus$ and OR'$^\ominus$, where R is a hydrocarbon radical and R' is a substituted hydrocarbon radical and preferably chloro-substituted as above indicated. The metals are found to have an atomic weight below 66.

The catalyst may be made insoluble by use of difunctional anions of the type $^\ominus$O—R—O$^\ominus$, where R is hydrocarbon or halogen-substituted hydrocarbon to give linear polymeric complexes. Thus, ethylene glycol, propylene glycol, glycerol, pentaerythritol, cellulose and methyl cellulose can be used in place of the alcohols used in preparing the alkoxides to give polymeric or even crosslinked metal alkoxide catalysts.

The catalysts may as indicated in some examples be prepared by one or more of the following procedures, depending upon the particular catalyst desired:

(a) Reacting the metal with the alcohol or phenol to form the metal alkoxide.

(b) Reacting the metal halogenide with an alkali metal alcoholate, including phenylate to form the halogenated metal alkoxide.

(c) Mixing of alcoholate and halogenide to form type C above.

(d) Reacting metal chloride with an epoxide.

In the latter case, metal chlorides of the Lewis acid type tend to polymerize the epoxide, giving less specific catalysts. In order to avoid this, it is preferable to start with a halogenide of a lower valence (less than 3) and subsequently oxidize it to the desired valence. Alternatively, one can start with a higher valence metal halide and reduce it to the desired valence by means of a metal which is readily oxidized to a metal compound wherein the metal has a lower valence, thus obtaining directly a type C binary catalyst mixture. This is illustrated schematically by the following equations:

$$H_2CrO_4 + 2ROH \rightarrow CrO_2(OR)_2 + H_2O$$

and

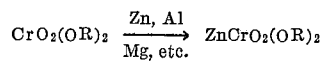

In general the best catalyst mixtures to obtain the highest yields of isotactic polymers are homogenous liquid systems either in straight monomer or diluted in diethyl ether at a temperature of about 75 to 85° C. as hereinafter described in more detail.

While an aluminum trialkyl or other coordinating metal alkyl may be used as a catalyst, generally more aluminum trialkyl catalyst is used than when a coordinating metal alkoxide/coordinating metal halide and the resulting reaction product is much less crystalline and has a much lower molecular weight. Thus, while about 0.5 to 2 percent by weight of the latter catalyst is preferred, the preferred range of aluminum trialkyl or other coordinating metal alkyl is about 3 to 8 percent by weight. Even so the reaction products formed are not generally of high enough molecular weight to be useful as films, coatings, and elastomers as are the polymers made with the coordinating metal alkoxide catalyst. For example, the high molecular weight phenyl glycidyl ether polymers can be easily dissolved in hot cyclohexanone or o-dichloro benzene, diluted with an organic solvent such as toluene and the solution cast and heated to form a light clear film on, for example, a white polyvinyl chloride article.

The temperature preferred for polymerization depends upon the speed desired and that in turn depends in part on the olefin oxide to be polymerized; the lower molecular weight olefin oxides, in general, polymerize at a faster rate at a given temperature than the higher olefin oxides. Thus, ethylene oxide polymerizes quite rapidly at room temperature whereas the rate of polymerization of PGE (phenyl glycidyl ether) or propylene oxide at room temperature is quite low. The molecular weight of the resultant polymer is generally somewhat reduced when the speed of the reaction is increased above a certain rate by raising of temperature. It is preferred to polymerize ethylene oxide at room temperatures, although temperatures as high as 100 or 150° C. or even 200° C. or so may be used. The propylene oxide and PGE are preferably polymerized at temperatures somewhat above room temperature and temperatures of 50 to 150° C. are ordinarily used, and temperatures of about 70 to 100° C. are generally preferred. Temperatures above 200° have a tendency to lower the molecular weight of the polymer too much for many purposes and are not recommended unless a lower molecular weight polymer is desired.

In general the temperature at which the polymerization of all olefin oxides can be carried out may be as low as 0° C. and as high as 200 or 250° C. Lower temperatures generally reduce the speed of the polymerization and increase the molecular weight of the resultant polymer; in general, however, the speed of the polymerization becomes too slow. For greatest economy the temperatures below 10° C., and in most cases the temperatures appreciably below room temperature, and temperatures higher than 100° C. are generally less desirable when a very high molecular weight polymer is to be obtained.

Inasmuch as polymerization is accelerated by increase in temperature, within the range of stability of the polymer, control of the reaction rate may be accomplished by raising or lowering of the temperature.

The rate of polymerization is also influenced to some extent by catalyst concentration; as the amount of catalyst is increased, up to about 1% or even up to 2% in some instances, an increase in rate usually results.

The catalyst may be removed from the polymer by dissolving the polymer produced in solvent preferably with addition of a small amount of water and crystallizing the polymer from the solution by lowering the temperature thereof. By several successive recrystallizations, substantially all of the catalyst may be removed from the polymer. However, as aforesaid in the case of aluminum alkoxide and zinc catalysts, or in the case of aluminum and magnesium alkoxide catalysts, generally, removal of the catalyst is unnecessary because it does not appear to have noticeable detrimental effects on the polymer.

In some cases it is desirable that the polymerization be carried out in the presence of a solvent, for example in the presence of an aliphatic or an aromatic hydrocarbon, chlorinated hydrocarbon or anhydrous ether. However, the presence of solvent is in general found to favor the formation of lower molecular weight polymers and found to reduce the speed of the polymerization.

The molecular weight of the polymer is also increased by increasing the pressure. While polymerization can be carried on at atmospheric pressure to yield products of high molecular weight, the molecular weight and the speed of polymerization can be increased by increasing pressures. When suitable pressure apparatus is available, it may be desirable to carry out the polymerization at pressures above atmospheric or above 100 atmospheres, and pressures up to 15,000 atmospheres are commercially feasible.

The following examples, in which parts and percentages are of weight and percentages are based on the weight of monomer incorporated, illustrate the invention:

*Example 1*

A six-inch Pyrex test tube was filled with 9.1 ml. (10.0 grams) of phenyl glycidyl ether (PGE). To this was added 0.05 gram of aluminum isopropoxide (AIP) and 0.05 gram of freshly fused zinc chloride (ZC). The total weight of catalyst (AIP plus ZC) was 1 percent by weight of the monomer (PGE). The test tube was flushed with dry nitrogen and placed in a constant temperature bath at 80° C. ±2° Centigrade.

A reaction was evident after 1 day. After a reaction time of 4½ days, the tube was removed from the bath, cooled, and opened. The contents of the tube which had gelled were transferred to an Erlenmeyer flask and washed with acetone several times. Part of the contents were soluble in acetone at 25° C. and part insoluble. The insoluble material was a white powdery polymer which had a melting point of 192 to 194° C. The percent yield of white powder was about 2% by weight of the original monomer charge and about 7% by weight of the total reaction product obtained. The molecular weight was high, being over 20,000, as indicated by an intrinsic viscosity measurement of 0.35 at 25° C. in benzene.

The part of the polymerized material that was soluble in acetone was processed by adding the acetone filtrates dropwise with stirring to an excess of methanol. An oily polymer formed and was allowed to settle on the bottom of the flask. The supernatant liquid was decanted and the oil shaken with several portions of methanol, whereupon the oily polymer became more viscous until it no longer flowed. The percent of total reaction product obtained based on the monomer charge was about 30 percent, the polymeric material soluble in acetone being about 93 percent of the reaction product recovered. The acetone soluble polymer and the acetone insoluble polymers were both high molecular weight isotactic phenyl glycidyl ether polymers, the intrinsic viscosity of the former polymer being measured as 0.16 at 25° C. in benzene.

The crystalline isotactic polymer that was insoluble in acetone was also insoluble in the usual organic solvents such as benzene and toluene at room temperature. However, the polymer was soluble in hot (50° C. or more) cyclohexanone, ortho-dichlorobenzene, dimethyl formamide and phenyl glycidyl ether monomer.

An X-ray diffraction analysis was conducted on the high molecular weight acetone insoluble powder. The results indicate the polymer to be isotactic in structure and of relatively high molecular weight. The results are indicated in Table I.

TABLE I

| Ring Number | d, spacing (in A.) | Relative Intensity |
| --- | --- | --- |
| 1 [1] | 10.054 | S. |
| 2 | 7.8933 | S. |
| 3 | 6.2757 | W. |
| 4 | 5.4666 | S. |
| 5 | 4.9511 | VW. |
| 6 | 4.5715 | VS. |
| 7 | 4.0919 | VS. |
| 8 | 3.8306 | VS. |
| 9 | 3.5728 | VW. |
| 10 | 3.3482 | S. |
| 11 | 3.0253 | VW. |
| 12 | 2.7281 | VW. |
| 13 | 2.4596 | VW. |
| 14 | 2.3018 | VW. |
| 15 | 2.1641 | VW. |
| 16 | 2.0517 | VW. |
| 17 | 2.0128 | VW. |
| 18 | 1.8574 | VW. |
| 19 | 1.8057 | VW. |

[1] Doubtful.

In the above table, S means the intensity at the spacing indicated was strong, W means weak, and VW means very weak. The symbol VS indicates very strong.

*Example 2*

A series of polymerization reactions were conducted using various amounts of phenyl glycidyl ether monomer and various amounts of and types of catalysts as indicated in Table II. The reactions were carried on in test tubes as in Example I using the reaction temperature and time recorded in Table II.

The reaction product of each test tube was washed with acetone several times. As described in Example I, part of the material was insoluble (identified as I in Table II), and part was soluble in acetone.

The acetone filtrates containing the acetone soluble material were added to methanol dropwise as described in Example I, whereupon generally an oily material separated. This oily material was separated from the supernatant liquid and shaken with several portions of methanol. The oil became more viscous until it no longer flowed. The oily material was then dissolved in acetone and dried or dissolved in benzene and freeze dried to obtain a phenyl glycidyl ether polymer (identified as II in Table II).

In handling the acetone soluble portion, benzene was sometimes substituted for the acetone as indicated in Table II. Sometimes, a solid formed when the acetone filtrates were added to an excess of methanol. The solid polymeric material (identified as III in Table II) generally had a lower molecular weight than polymers I and II.

While not shown in Table II, sometimes the methanol treating solutions were evaporated to recover unreacted phenyl glycidyl ether monomer along with a very low molecular weight polymer.

Details of the polymerization reactions and polymers formed are shown in Table II which follows:

The reaction product obtained in the reaction run identified as PGE (47) in Table II was processed to yield four polymers marked $I_A$, $I_B$, II and III in Table II. Infra

TABLE II

| Reaction Ident. PGE | Initial Wt. of Monomer Grams | Catalyst and Medium | Temp. °C. | Reaction Time | Description of Mixture |
|---|---|---|---|---|---|
| 20 | | 1% AIP-ZC-bulk | 150 | 4 days | Contents of tube solidified. |
| 22 | 5 | do | 80 | 20 days | White solid dispersed in brown monomer. |
| 23 | 5 | 20% KOH-bulk | 80 | 21 days | |
| 24 | 40 | 1% AIP-ZC-bulk | 80 | 4½ days | Solidified (gelled). |
| 19–28 | 10 | do | Room temp | 9½ months | White gelled. |
| 28 | 44 | do | 80 | 5 days reaction evident after 3 days. | Gelled. |
| 34 | 10 | 5% Al (Et)₃, bulk | Room temp | 7 days gelled in 2½ days. | Do. |
| 37–2 | 5.5+5 ml. benzene | 1% AIP-ZC benzene solvent. | 80 | 21 days reaction evident after 3 days. | Solid floating in thick liquid. |
| 37–6 | 10 | 1% liquefied AIP+ZC-bulk | 80 | 28 days reaction evident after 1 day. | Gelled. |
| 37–1 | 10 | 1% Al (Et)₃ | 80 | 32 days reaction evident after 1 day. | Clear yellow homogenous gell. |
| 37–3 | 5.5+5 ml. benzene | do | 80 | 35 days gelled after 1 day. | Yellow opaque gell of medium hardness. |
| 47 | 55 | 1% AIP-ZC bulk. Stirring open system. | 80 | 5 days solidified after 2½ days. | Fairly hard solid mass, Yellow tinge. I, washed with boiling benzene, to yield $1_A$ and $1_B$. |

| Reaction Ident. PGE | Description of Fraction | M.P. °C. | [n] and X-ray | Percent Yield of Fraction | Total Percent Conversion Polymer |
|---|---|---|---|---|---|
| 20 | White powder, insoluble | 165–175 | | | |
| 22 | I, White powder, insol. (25°) | 180–190 | Crystalline | 12.5 | 18.8 |
|  | II, Slightly brown solid | | | 6.3 | |
| 23 | Makes acetone, DMF cloudy, but can't filter. | | | | |
| 24 | I, White powder, insol. (25°) | 192–194 | 0.35 | 7.5 | |
|  | II, Rubbery—insol. in methanol, sol. in acetone. | | 0.16 | | |
| 19–28 | I, White powder, insol. (25°) | 180–190 | | 20 | 35 |
|  | II, Light brown oil—no flow, insol. in MeOH. | | 0.040 | 15 | |
| 28 | I, White powder, insol. (25°). Recryst. from dioxane. | Softens at 190. M.P. 205–210. | | 13.6 | 17 |
|  | II, Brown, tacky—sol. in benzene, insol. in acetone and methanol. | | 0.132 | 3.4 | |
| 34 | I, White powder, insol. (25°) | 195–210 | | 4.2 | 30.2 |
|  | II, White, tacky, insol. in MeOH | | 0.021 | 26.0 | |
| 37–2 | I, White powder, insol. (25°) | 182–190 | | 15.27 | 54.54 |
|  | II, White solid, sol. in benzene | 97–117 | Slightly crystalline 0.093 | 19.90 | |
|  | III, Yellow, tacky, insol. in MeOH | | 0.028 | 24.36 | |
| 37–6 | I, White powder, insol. (25°) | 180–190 | | 33.1 | 74.1 |
|  | II, Light yellow, tacky, insol. in MeOH | | 0.052 | 41.0 | |
| 37–1 | I, Off-white solid, insol. (25°) | 185–197 | | 2.4 | 46.9 |
|  | II, Yellow, tacky, insol. in MeOH | | 0.056 | 33.5 | |
| 37–3 | I, White powder, insol. (25°) | 190–200 | | 12.73 | 30.91 |
|  | III, Yellow, tacky, insol. in MeOH | | 0.078 | 18.18 | |
| 47 | I, White powder | 170–180 | | 49.09 | 73.09 |
|  | IA, White powder, insol. (25°) | 186–189 | | 18.69 | |
|  | IB, White solid, sol. in benzene, insol. in methanol and acetone. | 150–160 | 0.230 | 30.40 | |
|  | II, White solid, sol. in benzene, insol. in acetone and methanol. | 85 | 0.194 | 4.60 | |
|  | III, Yellow-orange, tacky | | 0.080 | 19.40 | |

In the above table, AIP is aluminum triisopropoxide, ZC is zinc chloride, Al (Et)₃ is triethyl aluminum, and MeOH is methyl alcohol.

red analyses of polymers 47 $I_A$, 47 $I_B$, 47 II and 47 III were made using potassium bromide and carbon tetrachloride, the results of which are recorded in Table III.

TABLE III

| I_A (KBr) | | I_B (KBr) | | II (KBr) | | III (in CCl_4) | |
|---|---|---|---|---|---|---|---|
| (Microns) | Percent Transmission | (Microns) | Percent Transmission | (Microns) | Percent Transmission | (Microns) | Percent Transmission |
| Base at 69% | | Base at 81% | | Base at 85% | | Base at 97% | |
| 2.90 | 62 | 2.90 | 75 | 2.89 | 71 | 3.24 | 77 |
| 3.26 | 57 | 3.25 | 75(S) | 3.25 | 75 | 3.37 | 56 |
| 3.40 | 40(S) | 3.45 | 59 | 3.37 | 57 | 3.43 | 57 |
| 3.45 | 37 | 6.24 | 27 | 3.44 | 58 | 6.23 | 15 |
| 6.24 | 17 | 6.27 | 33(S) | 6.23 | 26 | 6.28 | 32 |
| 6.27 | 20(S) | 6.68 | 24 | 6.28 | 38 | 6.67 | 10 |
| 6.68 | 17 | 6.85 | 42 | 6.67 | 24 | 6.78 | 46 |
| 6.86 | 26 | 7.15 | 68(S) | 6.80 | 47 | 6.85 | 46 |
| 7.13 | 53 | 7.35 | 63(S) | 6.85 | 48(S) | 7.20 | 73 |
| 7.35 | 43 | 7.50 | 59(S) | 7.50 | 67(S) | 7.47 | 65 |
| 7.70 | 27 | 7.70 | 43 | 7.73 | 50 | 7.67 | 38 |
| 8.05 | 12 | 8.05 | 18 | 8.04 | 20 | 7.75 | 48 |
| 8.55 | 26 | 8.54 | 42 | 8.55 | 53 | 8.05 | 5 |
| 8.73 | 17 | 8.70 | 31 | 9.65 | 39 | 8.53 | 35 |
| 8.95 | 18 | 9.70 | 30 | 11.43 | 68 | 9.60 | 25 |
| 9.70 | 15 | 9.83 | 33 | 12.34 | 63 | 9.77 | 55 |
| 11.35 | 26 | 11.37 | 54 | 13.35 | 26 | 10.00 | 75 |
| 11.63 | 35 | 12.35 | 53 | 14.53 | 34 | 10.15 | 82 |
| 12.35 | 29 | 13.38 | 22 | | | 10.80 | 85 |
| 13.43 | 12 | 14.55 | 30 | | | 11.35 | 68 |
| 14.45 | 17 | | | | | 14.50 | 18 |
| | | | | | | 14.85 | 47 |

In the above table, S indicates a shoulder at the particular percent transmission and wave length noted.

It is noted that even though the melting points of polymers 47 I_B and 47 II are relatively low, their molecular weights are relatively high as indicated by their intrinsic viscosities and they are partially isotactic in structure.

In the above examples, although the best results are obtained with phenyl glycidyl ether, all or part of the phenyl glycidyl ether monomer can be substituted by other substituted glycidyl ether monomers of the general formula:

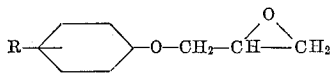

where R is a halogen such as bromine, fluorine, iodine and preferably chlorine or R is nitro; or R is an alkyl group of 1 to 5 carbon atoms such as ethyl, propyl, isopropyl, butyl, pentyl and preferably methyl; or R is an aryl radical such as phenyl.

Suitable substituted glycidyl ether monomers in accordance with the above disclosure are halo, alkyl, aryl and nitro substituted phenylene glycidyl ethers, generally ortho and para substituted although meta substituted are also suitable such as p-chloro phenylene glycidyl ether, o-chloro phenylene glycidyl ether, ortho and para nitro phenylene gycidyl ethers, p-methyl phenylene glycidyl ether, and diphenyl glycidyl ether.

Mixtures of phenyl glycidyl ether monomer (or other substituted glycidyl ether monomer) and other olefin oxide monomers such as propylene oxide and ethylene oxide can be used to form valuable reaction products and particularly solid high molecular weight isotactic polymers.

It is well understood that, in accordance with the provisions of the patent statutes variations and modifications of the specific invention may be made without changing the spirit thereof.

What I claim is:

1. The method for the production of a polyether which comprises polymerizing under substantially anhydrous conditions at a temperature of from about room temperature to 200° C., (1) a monomeric material selected from the class consisting of A and a mixture of A and at least one olefin oxide selected from the group consisting of ethylene oxide and propylene oxide, A having the formula:

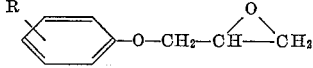

where R is a radical selected from the group consisting of hydrogen, halogen, nitro, alkyl and phenyl radicals, where said alkyl radical has from 1 to 5 carbon atoms, in contact with (2) from about 0.5 to 2% by weight of said monomeric material of a catalyst comprising (C) aluminum triisopropoxide and (C') zinc chloride.

2. The method according to claim 1 in which said monomeric material is phenyl glycidyl ether.

3. The method according to claim 1 in which said monomeric material is p-methyl phenylene glycidyl ether.

4. The method according to claim 1 in which said monomeric material is diphenyl glycidyl ether.

5. The method according to claim 1 in which said monomeric material is p-chlorophenylene glycidyl ether.

6. The method according to claim 1 in which said monomeric material is o-chlorophenylene glycidyl ether.

7. The method for the production of a polyether which comprises polymerizing under substantially anhydrous conditions (1) a monomeric material selected from the class consisting of A and a mixture of A with at least one olefin oxide selected from the class consisting of ethylene oxide and propylene oxide, A having the general formula:

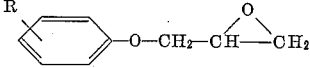

in which R is a substituent selected from the group consisting of the hydrogen atom, halogen atoms, the nitro group, the phenyl group and alkyl groups of from 1 to 5 carbon atoms, in contact with (2) a catalyst comprising (C) a material selected from the class consisting of materials having the respective general formulae $Me(OR)_x$, $Me(OR')_x$ and $Me(Y)_m(OR)_n$ in which each R is selected from the class consisting of alkyl and aryl groups, each R' is selected from the class consisting of halogen-substituted alkyl groups and halogen-substituted aryl groups and halogen-substituted aryl groups, each Y is a substituent selected from the class consisting of Cl, Br, O and alkyl groups, each $x$ is equal to the valence of Me, the sum of $m$ and $n$ is equal to the valence of Me and each Me is coordinating metal selected from the class consisting of aluminum, beryllium, cobalt, iron, magnesium, nickel, titanium and zinc, and (C') an electron accepting compound selected from the class consisting of oxides and halides of a coordinating metal selected from the class consisting of beryllium, divalent cobalt, copper, divalent iron, lithium, magnesium, divalent nickel and zinc, the mol percent ratio of C to C' being from 95:5 to 5:95, said catalyst (2) being present in a minor amount by weight based on the weight of material (1) but in an amount sufficient to polymerize said material (1).

8. The method of claim 7 wherein the material (1) is polymerized at a temperature of from about room temperature to 200° C. in contact with from about 0.5 to 2% by weight of catalyst (2) based on the weight of material (1).

9. The method of claim 8 wherein A is phenyl glycidyl ether.

10. The method of claim 9 wherein A is phenyl glycidyl ether.

11. The method of claim 10 wherein C is a compound of the formula $Al(OR)_3$ in which each R is an alkyl group and C' is a zinc halide.

References Cited by the Examiner

UNITED STATES PATENTS

| | | | |
|---|---|---|---|
| 2,181,085 | 11/1939 | Alquist et al. | 260—47 |
| 2,221,818 | 11/1940 | Slagh et al. | 260—47 |
| 2,440,750 | 5/1948 | Kraus et al. | 260—448 |
| 2,767,158 | 10/1956 | Schlenker et al. | 260—47 |
| 2,800,465 | 7/1957 | Nelson et al. | 260—88.1 |
| 2,870,099 | 1/1959 | Borrows et al. | 260—2 |
| 2,870,100 | 1/1959 | Stewart et al. | 260—2 |
| 2,970,984 | 2/1961 | D'Alelio | 260—47 |
| 3,014,890 | 12/1961 | Bradley et al. | 260—2 |
| 3,024,219 | 3/1962 | France et al. | 260—2 |
| 3,043,881 | 7/1962 | Wismer | 260—47 |

FOREIGN PATENTS 477,843  1/1938  Great Britain.

OTHER REFERENCES

Chemical Abstracts, 48, 6734 h (1954).
Chemical Abstracts, 47, 3611 a (1953).
Chem. Eng. News, July 8, 1957, vol. 35, page 24.
Moeller: "Inorganic Chemistry," page 405 (1952).

WILLIAM H. SHORT, *Primary Examiner.*

MILTON STERMAN, PHILLIP E. MORGAN, JOSEPH R. LIBERMAN, HAROLD N. BURSTEIN, LOUISE P. QUAST, *Examiners.*

S. N. RICE, A. L. LIBERMAN, R. J. BUTTERMARK, T. D. KERWIN, *Assistant Examiners.*